April 17, 1962 H. W. RUBY 3,029,958
PORTABLE CEMENT SILO
Filed Oct. 8, 1956 3 Sheets-Sheet 3
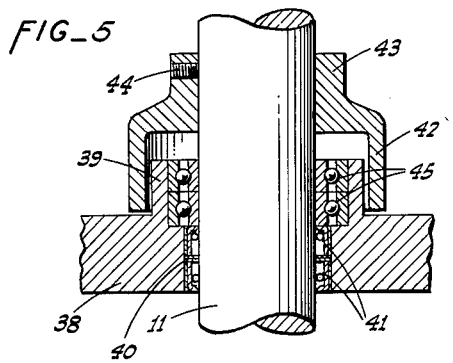
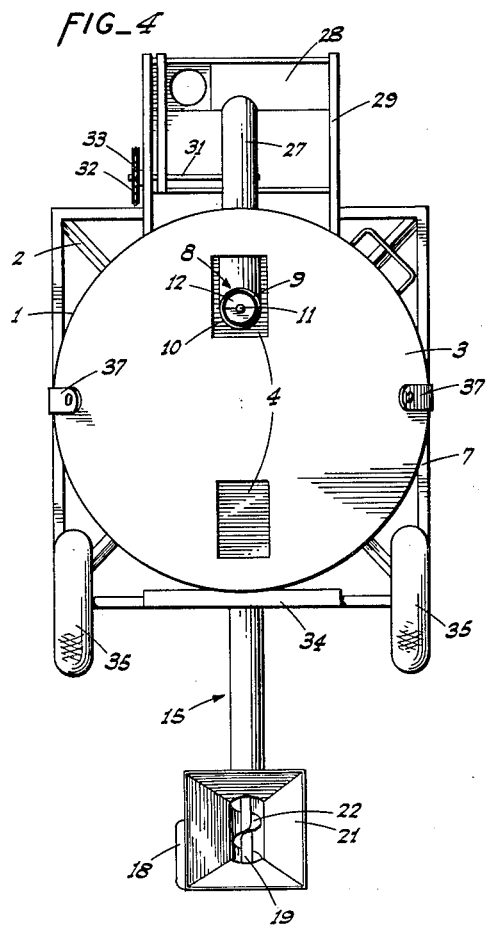
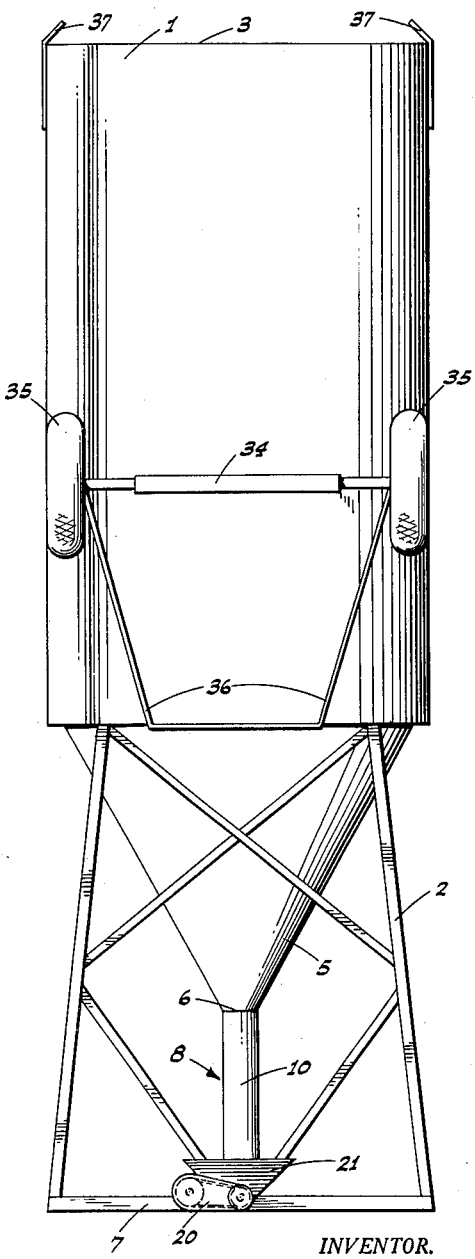
INVENTOR.
Harold W. Ruby
BY Webster & Webster
ATTORNEYS

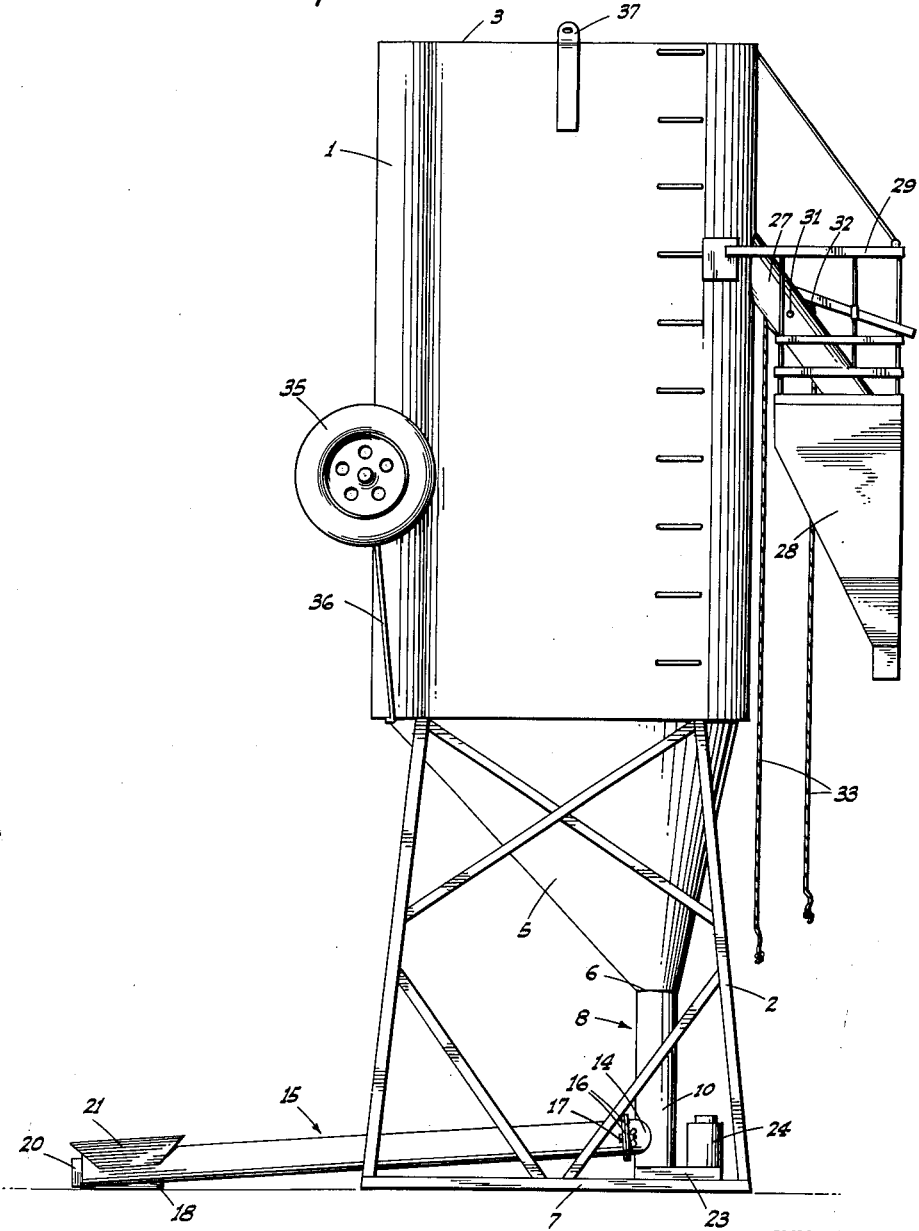
FIG_1

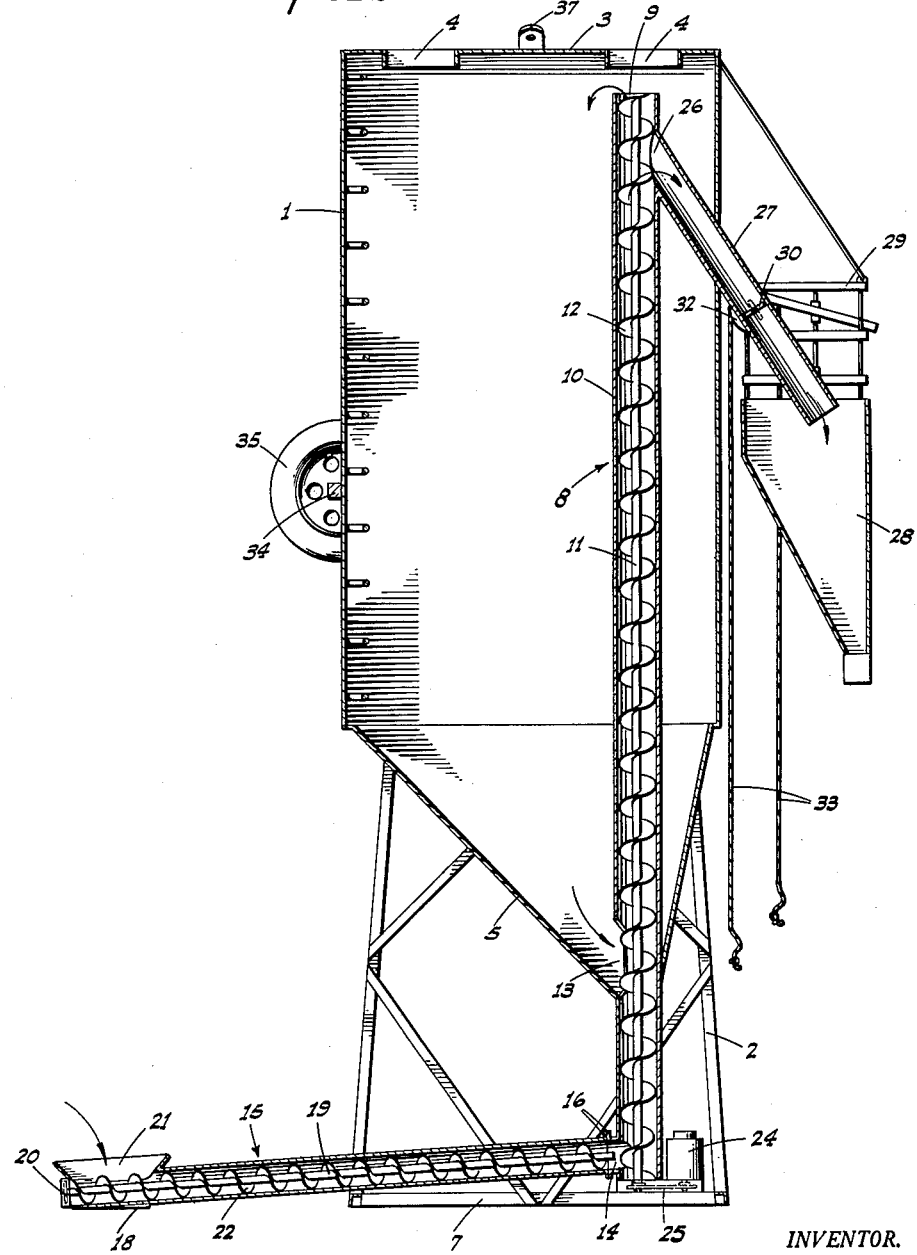

United States Patent Office 3,029,958
Patented Apr. 17, 1962

3,029,958
PORTABLE CEMENT SILO
Harold W. Ruby, % Clark's Welding Works,
Perkins, Calif.
Filed Oct. 8, 1956, Ser. No. 614,431
1 Claim. (Cl. 214—2)

The present invention is directed to, and it is a major object to provide, a portable cement silo of novel construction and function; such silo being especially designed, but not limited, for use to store dry bulk cement adjacent, and to supply the same to, a batching plant on a construction project or the like.

Another important object of the invention is to provide a portable cement silo, as above, which embodies a novel power actuated conveyor assembly which is operative, selectively and in response to merely the opening or closing of a valve, to load or unload the cement receiving bin of the apparatus.

A further object of the invention is to provide a portable cement silo, as in the preceding paragraph, in which said power actuated conveyor assembly is arranged to receive dry bulk cement directly from a dump truck and to then transfer the cement to and load it into the bin of the apparatus.

An additional object of the invention is to provide a portable cement silo which—when empty and out of use—can be readily and easily transported by towing from one site to another; the silo—while in an erect position for use—being adapted to be tipped or lowered to horizontal for transport, and wheels suitably mounted on the silo then engaging the ground.

It is also an object of the invention to provide a portable cement silo which is designed for ease and economy of manufacture, and long service with a minimum of maintenance or repair being required.

A still further object of the invention is to provide a practical, reliable, and durable portable cement silo, and one which is exceedingly effective for the purpose for which it is designed.

These objects are accomplished by means of such structure and relative arrangement of parts as will fully appear by a perusal of the following specification and claims.

In the drawings:

FIG. 1 is a side elevation of the portable cement silo as erected for use.

FIG. 2 is a similar view but in section.

FIG. 3 is a side elevation of the portable cement silo taken 90° from the position of FIG. 1 and looking at the same opposite the scale hopper.

FIG. 4 is a top plan view of the portable cement silo in the position shown in FIG. 1.

FIG. 5 is an enlarged fragmentary elevation, mainly in section, showing a preferred form of seal assembly for use in connection with the lower end portion of the shaft of the vertical auger conveyor.

Referring now more particularly to the drawings and to the characters of reference marked thereon, the novel, portable cement silo comprises a vertically elongated cylindrical bin 1 disposed—in use—some distance above ground; the bin 1 being supported from below by an upstanding skeleton frame 2.

At its upper end, the bin 1 is fitted with a top closure plate 3 having access ports 4 therein.

At its lower end, the bin 1 includes a generally funnel-shaped hopper bottom 5 which terminates at its lower end, as at 6, above the base 7 of frame 2.

A vertically disposed auger conveyor or elevator, indicated generally at 8, extends upwardly from adjacent the base 7 through the lower end 6 of the hopper bottom 5, and thence continues upwardly within the bin 1 to an upper end termination, as at 9, adjacent but short of the top closure plate 3.

The auger conveyor 8 consists of a tube 10 in which the conveyor shaft 11 is centrally disposed, such shaft carrying the helical screw or auger flights 12 which run in relatively close fitting relation in the tube 10.

Such tube 10 is open at its upper end 9; is formed with a laterally opening port 13 therein substantially at the lower end of the hopper bottom 5; and is formed immediately adjacent its lower end and below said hopper bottom 5 with a relatively short lateral duct 14.

An extension auger conveyor, indicated generally at 15, is removably attached—at its inner end—to the duct 14 and thence extends laterally outwardly—at substantially ground level—to an outer end termination clear of the vertical plane of the cylindrical bin 1. Such auger conveyor 15 is removably attached to the duct 14 by mating flanges 16 secured together by wing-nutted bolts 17. The auger conveyor 15, which is self-powered, is driven from the outer end by a motor, indicated generally at 18, coupled in driving relation to the conveyor shaft 19 by drive unit 20; the outer end of said conveyor 15 being formed with a cement receiving hopper 21 which delivers to the helical screw or auger flights 22 of said conveyor. As shown in FIG. 1, the motor rests on the ground, so that the weight thereof is not taken by the conveyor tube or housing, and no strain is placed on the holding bolts 17.

The vertical auger conveyor 8 is driven from its lower end in the following manner:

The central shaft 11 extends at its lower end into a case 23 mounted on the base 7 of frame 2; the lower end of tube 10 abutting the top of said case adjacent one end thereof. A motor 24, preferably in association with a reduction gear mechanism, is mounted on the case 23, and is connected to the lower end of the shaft 11 by a drive unit 25 enclosed within said case 23.

Adjacent but short of its open upper end 9, the tube 10 of auger conveyor 8 is formed with a lateral port 26 which is in communication with a downwardly and outwardly inclined spout 27 fixed to the tube, and thence extending through the side of the bin 1. At its lower end, the spout 27 is positioned to discharge into a scale hopper indicated generally at 28, and which is of conventional construction, being adapted to weigh and discharge dry bulk cement in predetermined amount. The scale hopper 28 is suitably removably suspended from an outrigger 29 mounted in connection with the adjacent side of the bin 1.

A butterfly valve 30 is disposed in the spout 27 intermediate its ends, and such valve is carried on a cross shaft 31; such cross shaft 31 being fitted at one end and exteriorly of the spout 27 with a pulley 32 over which a control rope 33 is trained intermediate its ends. By manipulating the control rope 33, an operator can readily cause opening or closing of the butterfly valve 30.

For transport of the apparatus from site to site, in the manner hereinafter described, the bin 1 is fitted—opposite the scale hopper 28—with a horizontal transverse axle 34 having rubber-tired wheels 35 journaled on the outer ends thereof. Stay bars 36 hold the axle 34 rigid, and such axle is of sufficient length that the wheels 35 have spacing which is at least substantially equal to the diameter of the bin 1. At the top and on opposite sides the bin 1 is fitted with attachment ears 37 adapted for connection with a towing instrumentality.

In use of the above described apparatus, and with the same disposed in its vertical or upright position, dry bulk cement is discharged into the hopper 21 from a transport truck, and such cement is then fed by the auger conveyor 15 through the duct 14 into the lower end of the auger conveyor 8; the latter then carrying the cement upwardly and—when butterfly valve 30 is closed—delivering the cement from the open upper end 9 of tube 10 whence such cement falls into and loads the bin 1. When the auger conveyor 8 is so loading the bin 1, the cement in said conveyor is under sufficient compression from below and extending above the port 13 to prevent any appreciable re-circulation of cement from the bottom of the bin 1 and back through said conveyor 8.

When it is desired to use the scale hopper 28 to weigh and feed a predetermined quantity of the cement to an adjacent batching plant (not shown), the butterfly valve 30 is opened. When this occurs, the cement being carried upwardly by the auger 8 delivers into the spot 27 rather than out of the open upper end 9; this being accomplished whether or not cement is being fed into the lower end of conveyor 8 by conveyor 15. If conveyor 15 is not in operation when the cement is being delivered from conveyor 8 into the spout 27, the said conveyor 8 draws the cement from the bottom of the bin 1 through port 13.

It will thus be recognized that by reason of the described assembly the conveyor 8 is operative—selectively—either to feed the cement into the bin 1 to load the same, or into the spout 27 for discharge of the cement into the scale hopper 28. This selective functioning of the apparatus is controlled merely by opening or closing the butterfly valve 30.

In FIG. 5, there is illustrated a preferred form of the seal assembly which may be used between the lower end of the auger conveyor 8 and the case 23 for the drive unit 25; such seal assembly not otherwise being shown and comprising the following:

The top 38 of the case 23 is formed in spaced, concentrically surrounding relation to the shaft 11 with an upstanding annular rim or flange 39; said shaft passing through an opening 40 in said top 38, and in which opening annular seals 41 are fitted in close surrounding relation to such shaft. An inverted cup 42 surrounds said rim or flange 39 in relatively close but rotatable relation, and such cup includes a hub secured to said shaft 11 by a set screw 44. Also, if desired, the rim or flange 39 may serve as the retaining means for shaft-engaging bearings 45. The inverted cup 42 is of a diameter so that it is received in relatively close but rotatable relation in the lower end portion of the tube 10.

The above described portable cement silo provides a very effective and reliable apparatus for the storage, and delivery of dry or bulk cement to a batching plant or the like, and additionally, the apparatus is readily portable. When it is desired to move the apparatus from one site to another, the extension auger conveyor 15 is removed by uncoupling the bolts 17; the scale hopper 28 is detached from the outrigger 29; and then the bin 1—which is empty—and the unitary frame 2 are tipped from a vertical position to a horizontal position with the wheels 35 in ground engagement. After the bin 1 and unitary frame 2 are so tipped, and with the wheels 35 then supporting the apparatus for movement along the ground, a tow bar unit, or the like (not shown) is connected to the ears 37 whereby the apparatus may be readily towed by a motor vehicle.

The detached conveyor 15 and scale hopper 28 are, of course, separately transported.

From the foregoing description, it will be readily seen that there has been produced such an apparatus as substantially fulfills the objects of the invention, as set forth herein.

While this specification sets forth in detail the present and preferred construction of the apparatus, still in practice such deviations from such detail may be resorted to as do not form a departure from the spirit of the invention, as defined by the appended claim.

Having thus described the invention, the following is claimed as new and useful and upon which Letters Patent is desired:

A portable silo comprising a normally upstanding frame adapted for ground support, a bin mounted on and supported by the frame and forming a rigid unit therewith, said unit being adapted to be tipped from an upstanding operating position to a substantially horizontal position for transport, a pair of transversely spaced wheels permanently mounted on and projecting from one side of the unit intermediate its ends in position for ground engagement when the unit is so tipped, elements on one end of the unit for supporting engagement with a transport vehicle, a material elevator in the bin including a housing projecting from the bottom of the bin, a substantially horizontal conveyor feeding to the lower end of the elevator, means detachably connecting said conveyor to the elevator housing, drive means for the conveyor mounted and detachable as a unit therewith, an elongated valved discharge spout leading directly from the upper end of the elevator through the side of the bin opposite the wheels, a scale hopper into which the spout delivers, and means mounting the hopper on the bin for removal without disturbing the spout.

References Cited in the file of this patent

UNITED STATES PATENTS

| | | |
|---|---|---|
| 284,263 | Walsh | Sept. 4, 1883 |
| 1,450,461 | Straight | Apr. 3, 1923 |
| 2,048,877 | McCrery | July 28, 1936 |
| 2,342,528 | Carbaugh | Feb. 22, 1944 |
| 2,347,437 | Saxe | Apr. 25, 1944 |
| 2,565,663 | Osterbur et al. | Aug. 28, 1951 |
| 2,624,483 | Ketzel | Jan. 6, 1953 |

FOREIGN PATENTS

| | | |
|---|---|---|
| 769,063 | France | June 5, 1934 |